G. H. CHINNOCK.
SHEET-METAL CANS.
No. 172,553. Patented Jan. 25, 1876.
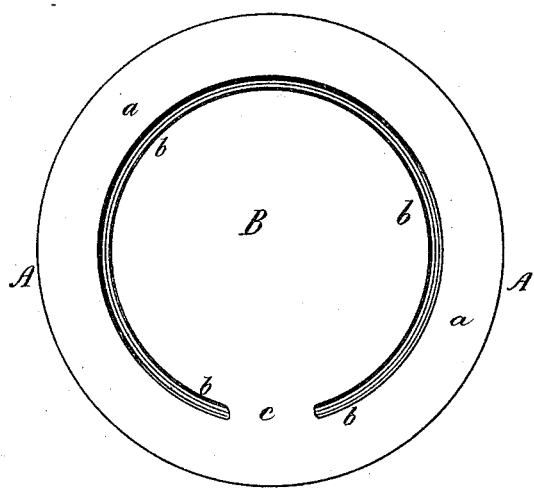
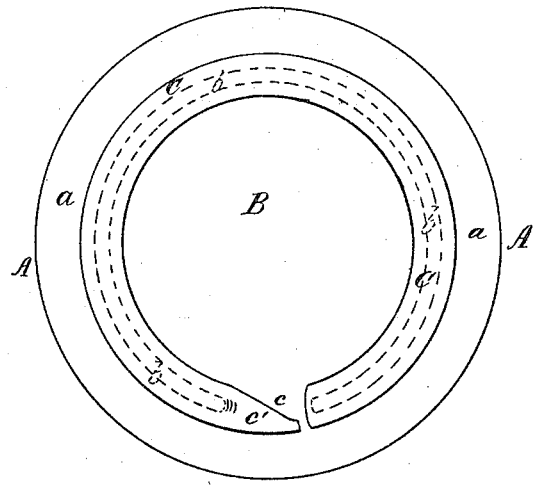
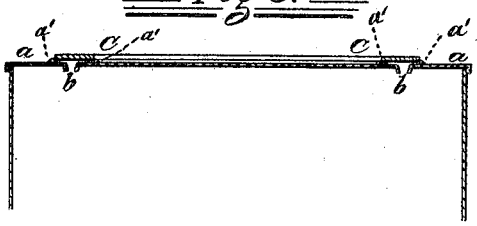
Witnesses
W. M. Edwards
A. Nicollet
Inventor
George H. Chinnock
per
James A. Whitney
Atty.

UNITED STATES PATENT OFFICE.

GEORGE H. CHINNOCK, OF BROOKLYN, NEW YORK.

IMPROVEMENT IN SHEET-METAL CANS.

Specification forming part of Letters Patent No. 172,553, dated January 25, 1876; application filed October 26, 1874.

*To all whom it may concern:*

Be it known that I, GEORGE H. CHINNOCK, of Brooklyn, in the county of Kings and State of New York, have invented an Improvement in Sheet-Metal Cans, of which the following is a specification:

In this my invention I construct the can with a top, head, or end piece, formed with an annular slot, over which, with its edges resting upon, but not between, the lips or edges of the aforesaid slot, I place an annular strip of corresponding contour, which strip I solder to the upper surfaces of the edges of the slot aforesaid, one end of the strip being left free, in order to afford a suitable hold when it is desired to tear the strip from its place (the solder being ruptured in such removal) to detach the top, head, or end piece from the can; the flat form of the annular strip, together with the manner in which it is soldered in place, preventing the direct soldering together of the lips or edges of the slot, which occurs when a wire is inserted between (in contradistinction to, upon, and above) the aforesaid lips or edges, because of the inevitable tendency of the molten solder to run across and upon the inserted wire, or below and across the same during the operation of soldering, this direct soldering of the lips or edges of the slot preventing the yielding or rupture of the solder when strain is exerted upon the inserted wire, and thereby nullifying or preventing the advantages sought to be obtained by the use of the said wire between the lips or edges aforesaid.

Figure 1 is a plan view of a can previous to the attachment thereto of the flat annular wire. Fig. 2 is a plan view of the can constructed complete according to my invention, and Fig. 3 is a central vertical sectional view of the upper portion of the can represented in Fig. 2.

The body A of the can is of sheet-tin or the like, and may be of cylindrical, rectangular, or other suitable form, but preferably with flat ends, as at $a$. In one of these ends is formed an annular slot, $b$, the two ends of the said slot approaching within a slight distance—say, one-half inch, more or less—of each other, so that the part, B, surrounded by the slot is attached by a neck, $c$, to the body of the can. This slot may be formed in the end of the body of the can by punching, cutting, stamping, or other suitable means, and is, preferably, to be formed before the said end is attached to the sides of the said body. C is a thin strip of metal, tinned or treated to secure the adhesion of solder thereto, of a width sufficient to lie over the slot $b$, with its edges resting upon the upper surfaces presented at each edge of the said slot, as more plainly indicated in Fig. 3, one end, $c'$, of said strip resting upon the neck $c$, but free therefrom, the purpose of which will hereinafter appear. The outer and inner edges of the strip C are then, by the use of any suitable appliances, soldered, as indicated at $a'$, to the adjacent upper surfaces of the metal, upon which the strip rests at the edges of the slot, the strip lying flat and close upon the said surfaces, in such manner that the molten solder cannot pass underneath the same to the slot itself, so that this latter is always clear, and the only connection (except at the neck $c$) between the part B (constituting the top, head, or end piece of the can) and the adjacent edges of the body of the can being through, and by means of, the annular strip C, soldered, as just set forth, by which means, the accumulation of solder within the slot itself, and the direct soldering together of the lips of the slot itself, being prevented, the strip may always be detached by the exertion of a moderate degree of force applied to the free end $c'$, lying upon the neck $c$. The strip being thus detached, the part B may be turned up upon the neck $c$ as upon a hinge, and access be had to the interior of the case.

Instead of being connected with the body of the can by the neck $c$, the part B may comprise a simple disk, the edges of which lie at a suitable distance from those presented by the adjacent edge portion of the said body, in order to provide the requisite slot between. In this case the strip must be made somewhat longer than when such neck $c$ is provided, in order that the free end of said strip may overlap the other end of said strip. The strip itself may, when desired, be cut from sheet-tin; but it will be found much more economical to first draw the strip from iron rods or wire of suitable toughness, into thin, flat, straight strips; then, by any appropriate means or machinery, to coil the same into a helix, which, divided in a line parallel with its axis, will provide a number of divided rings or annular strips, which may be brought perfectly flat, or out of their somewhat helical curvature, by any suitable means, and afterward coated with soft metal to insure the adhesion of solder thereto.

I do not claim a cylindrical wire inserted between the central head or end piece of a sheet-metal can and the rim or edge of the body thereof, such being shown in the patent granted to Moritz Pinner, assignee of Jean Bouvet, June 28, 1864; neither do I claim as within the scope of this my present invention the devices shown and described in the patent of John Widgery, dated March 12, 1872; but What I do claim as my invention is—

In the flat end of a sheet-metal can, the slot $b$ around the head or top B, which is connected to the can by the neck $c$, in combination with the flat, soldered sheet-metal strip C, covering the slot, and having its free end projecting over and upon the neck $c$, substantially as and for the purpose set forth.

GEO. H. CHINNOCK.

Witnesses:
JAMES A. WHITNEY,
ADOLPHUS NICOLLET.